United States Patent [19]
Starlinger Huemer

[11] Patent Number: 5,845,995
[45] Date of Patent: Dec. 8, 1998

[54] BAG MADE OF POLYMER AND ESPECIALLY POLYOLEFINE FABRIC AND PROCESS FOR PRODUCING IT

[75] Inventor: Franz Starlinger Huemer, Vienna, Austria

[73] Assignee: Starlinger & Co. Gesellschaft mbH, Vienna, Austria

[21] Appl. No.: 732,308

[22] PCT Filed: Apr. 26, 1995

[86] PCT No.: PCT/AT95/00080

§ 371 Date: Oct. 16, 1996

§ 102(e) Date: Oct. 16, 1996

[87] PCT Pub. No.: WO95/30598

PCT Pub. Date: Nov. 16, 1995

[51] Int. Cl.$^6$ ................................................ B65D 30/18
[52] U.S. Cl. .................... 383/125; 383/117; 383/121; 383/908; 493/218; 493/219
[58] Field of Search ................................ 493/218, 219; 383/908, 121, 125, 126, 127, 54

[56] References Cited

U.S. PATENT DOCUMENTS

| | | | |
|---|---|---|---|
| 3,195,801 | 7/1965 | Symons et al. | 493/219 |
| 3,397,622 | 8/1968 | Goodwin | 493/218 |
| 3,448,666 | 6/1969 | Kappelhoff et al. | 383/125 |
| 3,570,749 | 3/1971 | Sato et al. | 383/908 |
| 3,660,150 | 5/1972 | Cooper | 383/908 |
| 3,736,219 | 5/1973 | McTaggart | 383/908 |
| 3,979,049 | 9/1976 | Achelpohl | 383/125 |

FOREIGN PATENT DOCUMENTS

| | | |
|---|---|---|
| 0 092 885 | 11/1983 | European Pat. Off. . |
| 3236770 A1 | 6/1983 | Germany . |
| 3336731 A1 | 4/1985 | Germany . |
| 892630 | 3/1962 | United Kingdom . |
| 1189029 | 4/1970 | United Kingdom . |

*Primary Examiner*—Stephen P. Garbe
*Attorney, Agent, or Firm*—Townsend and Townsend and Crew LLP

[57] ABSTRACT

This invention relates to a sack made of fabric consisting of monoaxially drawn, desirably single-layer, tapes of polymer, particularly polyolefine, preferably polypropylene, which fabric may be coated on one or both sides with a thermoplastic material, particularly polyolefine, wherein the fabric is a seamless tubular fabric or a flat fabric combined to form a tube and at least one end of the sack having in particular the shape of a box or a right parallelepiped is formed by folding the fabric ends to a particularly rectangular bottom surface. The present sack is characterized in that at least one end of the sack, particularly a bottom surface, is bonded, via an intermediate layer particularly made of thermoplastic, particularly polyolefine, preferably polypropylene material, and by means of heat, to a cover sheet made of fabric consisting of monoaxially drawn tapes of polymer, in particular polyolefine and preferably polypropylene, and in that only the external surface area, in particular less than 30% of the material thickness of the fabric tapes, includes disoriented polymer, in particular polyolefine and preferably polypropylene, molecules due to the heat, wherein in the rest of the material area the molecules are oriented. The invention also relates to a process for welding a cover sheet onto a bottom surface of the sack.

42 Claims, 5 Drawing Sheets

BAG MADE OF POLYMER AND ESPECIALLY POLYOLEFINE FABRIC AND PROCESS FOR PRODUCING IT

BACKGROUND OF THE INVENTION

1. Field of the Invention

This invention relates to a sack made of fabric consisting of monoaxially drawn, desirably single-layer, tapes of polymer, in particular polyolefine, preferably polypropylene, which fabric may be coated on one or both sides with thermoplastics, in particular polyolefine, wherein the fabric is either seamless tubular fabric or flat fabric combined to form a tube, and wherein at least one end of the sack having in particular the shape of a box or right parallelepiped is formed by folding the fabric ends to a preferably rectangular bottom surface, as well as to a process for producing such a sack.

2. Description of the Related Art

A variety of sacks is used to pack goods such as bulk material. Sacks can be roughly divided into pillow- and box- or block-shaped types. A pillow shape is usually created by manufacturing the bottoms with seams. A box or block shape is created by folding and bonding the bottom. It will be appreciated that a box shape allows for optimal use of the material surface, good stackability and an improved utilization of volume due to its brick shape. There is also the quasi-box shape which is a pillow sack on one side and a box sack on the other. Typically, sacks have a capacity of 10, 25, 100, 500 and 1000 kg. Suitable materials include natural fiber fabric such as jute, paper, plastic sheets and plastic fabric; within the last decades sacks made of natural fiber fabric have been replaced by sacks made of paper and plastic sheets and plastic fabric, because these are cheaper and offer technical advantages.

Paper does not have great strength. For this reason sacks often include various layers of paper, which increases material consumption. A paper sack is not watertight and partly non-resistant to chemicals. However, it can be produced at low cost and by using cheap adhesives.

Plastic sheets have no great strength either and therefore require a considerable thickness of the material used. Due to their high Young's modulus (elongation capability) they are not dimensionally stable and, what is more, sensitive to heat. The sack can be readily seam welded to a pillow shape, but is it not easily bonded so as to form a box- or block-shaped sack.

Plastic fabric consisting of monoaxially drawn tapes has the highest strength and is dimensionally stable, particularly when being coated. Compared to plastic sheets material consumption is much lower, yet the load-bearing capacity is the same. Sacks made of plastic fabric are usually made in pillow shapes with seams.

SUMMARY OF THE INVENTION

In order to produce a woven box sack the folded bottom is conventionally subjected to a quite elaborate bonding process by using a multi-component adhesive, since polypropylene and polyethylene materials which normally form the fabric can only be bonded with difficulty. Apart from the complex bonding process well-known adhesives have further drawbacks, such as low durability, brittleness due to temperature variations and loss of adhesiveness due to moisture. Further, these adhesives are insufficiently resistant to chemicals; typically, the material to be bonded has to undergo a surface treatment, such as a corona treatment, before being bonded. Considering the fact that every year billions of sacks are produced all over the world and that the sacks produced according to state-of-the-art methods have more or less pronounced drawbacks, it becomes clear that huge economic gains could be achieved if sacks or their manufacturing processes were improved. This invention aims at providing a sack which dramatically decreases piece costs as compared to conventional sacks while maintaining their load-bearing capacity, and which has even further positive characteristics.

The sack of the present invention consists of fabric of monoaxially drawn polyolefine tapes. These tapes are produced by stretching polyolefine sheets to four to ten times their original length, whereby the molecule chains in the tapes' longitudinal direction are oriented and thus have a strength in this direction which is about 6 to 10 times higher compared to the original sheet. The tape width is usually about 1.5 to 10 mm and the thickness 20–80 $\mu$m. Transverse strains cleave the tapes, which is why they are woven into circular or flat fabric made of weft and warp layers about perpendicular to each other. The fabric then has uniformly high tensile strength in all directions. In order to achieve dust and moisture proofness and to prevent the layers of tapes from sliding, a melt coating, which preferably consists or the same material as the tapes, can be applied to, and pressed into, the material on one or both sides thereof. The present sack can be shaped as a box or a quasi-box sack, these shapes being more favorable than pillow sacks.

German patent application No. 3236770 teaches a sack consisting of a fabric of monoaxially drawn polymer tapes, the fabric being a tubular fabric or a flat fabric connected to a tube, and at least one end of the sack being formed to a bottom surface by folding the fabric ends. The aim of the development disclosed in this document is to form the sack in such a way that, while it can be sealed and conglutinated with ease, it is also suitable for packaging breathing, preferably grained filling material. For this purpose, in the course of their production by coextrusion or lamination, tapes of polypropylene are first of all provided with sealing layers of a polymer material on both outer sides, subsequently drawn and heat-treated and finally worked into a breathing flat formation from which valve sacks are confectioned. According to German patent application No. 3236770 it is to be avoided to coat the fabric itself with a sealing layer, as this would result in loss of the breathing ability of the fabric.

The present box or quasi-box sack is characterized in that at least one end of the sack, particularly a bottom surface, is bonded, via an intermediate layer particularly made of thermoplastic, particularly polyolefine, preferably polypropylene material, and by means of heat, to a cover sheet made of fabric consisting of monoaxially drawn tapes of polymer, in particular polyolefine and preferably polypropylene, and in that only the outer surface areas of the bottom surface and the cover sheet, in particular less than 30% of the material thickness of the fabric tapes, include disoriented polymer, in particular polyolefine and preferably polypropylene, molecules due to the heat, wherein in the rest of the material area the molecules are oriented. Compared to conventional sacks the following advantages can be mentioned:

Higher strength and lower material comsumption compared to sacks made of paper and plastic sheets, high strength of the bottom bonding, no weak points caused by seam perforations of the fabric, water tightness and chemical resistance, low piece costs, durability since welded connections do not age or become brittle, easy disposability since the sack is exclusively made of pure polyolefine.

Since this welding leads to a loss in the orientation of molecular chains to a minor extent only, the fabric strength is hardly reduced.

Specific embodiments of the present sack are characterized in that the fabric parts folded to a sack end, in particular a bottom surface, do not or not substantially overlap each other, and in that a separate cover sheet is provided to seal the bottom, or characterized in that the sack end, in particular the bottom surface, and the cover sheet are formed by overlapping when folding the fabric of the sack. By selecting one of these embodiments the specific characteristics of the production machine can be taken into account.

If the sack does not consist of coated tape fabric, an intermediate layer made of polyolefine melt serving as a welding agent is interposed between the bottom surface and the cover sheet, which intermediate layer may also be applied to coated fabric. Appropriately, in the case of tape fabric coated on one or both sides this coating serves as an intermediate layer between the sack end, in particular the bottom surface, and the cover sheet.

In a favorable embodiment the thermoplastic material of the tape fabric coating and/or the intermediate layer is mixed with an ethylene and vinyl acetate copolymer, which decreases the melting point of the coating and increases its non-sliding characteristics. Therefore the sack of the invention can be welded and stacked with greater ease.

A problem concerning box- or block-shaped sacks is that by the overlapping of fabric flaps disposed on the narrow and longitudinal sides in order to form an end surface pockets are created inwardly of the sack. They are similar to a funnel having its outlet port at the end of a longitudinal folding edge. This problem arises particularly with so-called box-valve sacks or block bottom bags, into which a muff is inserted when they are being filled. This muff is used to introduce the filler material by means of compressed air. Incoming compressed air makes the pockets at the side opposite the valve swell and become funnel-shaped, and the material, which is most oftenly powdery, is pressed out of the sack through the "funnel outlet". For reasons inherent in the manufacturing process it is not possible to weld the cover sheet precisely to the folding edge, so that in most cases a small opening remains therein. This invention also provides a solution for this problem encountered by the present sacks. In a first approach there is provided at least one adhesive point or one adhesive area made of a cold-bonding agent, hot-melt-type adhesive or a thermoplastic material, in particular polyolefine, having a lower melting point than the material of the fabric or the intermediate layer at least on one side of an end surface formed by fabric flaps in an area close to, and particularly within, the common portion of the folding edge between a fabric flap disposed on the longitudinal side and one disposed on the narrow side. When the surface of the sack end is subjected to a hot-air welding process, adhesive material softens and flows into the folding edge, which tightly seals off the openings in the folding edge after the adhesive has cured.

Another approach designed to prevent filler material from leaking from the openings in the folding edges is to make it impossible, or at least more difficult, for the pockets to swell and thus for a funnel to form. According to the invention this can be achieved by providing at least on one side of the end surface formed by fabric flaps at least one of the longitudinal fabric flaps with at least one opening in the area which, in its folded state, overlaps a fabric flap disposed on the narrow side. By this opening in what has become the upper flap after folding the cover sheet, after being welded on, is welded with the lower flap through the opening, thereby preventing the pocket from swelling.

Another favorable embodiment of the invention which can equally prevent the pockets from swelling is characterized in that the fabric flaps disposed on the longitudinal and narrow sides and forming an end surface of the sack are at least partly welded together in the areas in which they overlap one another. This solution, however, requires a more elaborate manufacturing process, because additionally hot air needs to be blown in.

Yet another embodiment of the invention is characterized in that in the areas of the end surfaces in which the pockets are formed by folding all stacked layers of fabric are bonded by means of a welding point or a welding area. The loss of orientation of molecule chains occurring in the welded area has no effect on the overall strength, since several stacked layers of fabric are bonded to each other.

A particularly advantageous embodiment of the present sack is characterized in that between the sack end, i.e. the end surface, and the cover sheet at least one valve is provided through which the sack can be filled and which can be closed automatically by the pressure of the filler material when the sack is full. This so-called box-valve sack or block bottom bag is particularly useful for quick-filling installations, because no further operation is required for closing the filled sack.

In order to prevent the valve from being partly turned inside out when the filler muff is pulled out of the sack by the increased pressure within the sack when it is being filled, whereby the sealing effect would be rendered impossible, it is appropriate to provide an opening in at least one longitudinal fabric flap involved in the formation of the surface of the sack end in the area between the inner edge of the narrow-side fabric flap and the inner edge of the valve disposed between the narrow side and the longitudinal flaps. Therefore it is possible to weld the upper side of the valve with the cover sheet through the openings.

In the case of filled material which is transported by an air flow, for instance cement, it may be appropriate to have a perforated tape fabric, so that entrapped air can escape after the filling operation.

This invention also relates to a process for welding a cover sheet onto an end surface, and particularly onto a bottom surface, of a sack, particularly one having a box or right-parallelepiped shape, wherein the cover sheet and the sack material consist of sheets or fabrics of monoaxially drawn tapes of polymer, in particular polyolefine, preferably polypropylene, particularly having a thickness of 20–80 $\mu$m, preferably 30–50 $\mu$m, and wherein the fabrics are coated optionally on one or both sides with a melt made of a thermoplastic, particularly polyolefine, material, particularly having a thickness of 5–60 $\mu$m.

This process is characterized by interposing an intermediate layer of molten polymer, in particular polyolefine, preferably polypropylene, particularly having a thickness of 5–60 $\mu$m, particularly at a temperature of 150°–380° C., preferably 230°–260° C., between the end surface, and particularly the bottom surface, and the cover sheet, by the subsequent pressing of the end surface, and particularly the bottom surface, and the cover sheet against each other and by the cooling of the end or bottom surface, intermediate layer and cover sheet to ambient temperature.

This makes it much easier and cheaper to produce the sack, because expensive adhesives and complicated bonding processes are omitted. When bonding the bottom by means of welding, the high strength of the fabric is hardly affected.

Another embodiment of this process is characterized in that for the purpose of welding the cover sheet onto at least one end surface, particularly bottom surface, of a sack when using a fabric, which is coated on at least one side, for the sack and/or the cover sheet-instead of introducing molten thermoplastic material, in particular polyolefine, preferably polypropylene—the heating of the fabric coating is effected particularly by hot air until only an outer surface area plasticizes, particularly down to a penetration depth of 2–40 $\mu$m, particularly 3–10 $\mu$m. By directly heating and bonding fabric layers and omitting the step of extruding the intermediate layer the process can be made very efficient.

With regard to carrying out the process economically it is particularly advantageous, for the purpose of welding a cover sheet onto an end surface, particularly bottom surface, of a sack, to effect the cooling and pressing steps of the end or bottom surface and the cover sheet simultaneously by means of at least one cooled pressing element, particularly by means of a pair of rollers.

The intermediate layer made of molten plastic material, particularly polyolefine, preferably polypropylene, is conveniently applied through a broad-slit or fiber-extrusion die.

An embodiment of the present process is characterized in that for welding the cover sheet onto an end surface, particularly bottom surface, of a sack the heating and pressing steps of the end or bottom surface and the cover sheet are effected at least by a heated roller or plate with a line or point-like surface profile.

According to another embodiment of the present process the cover sheet is welded onto an end surface, particularly bottom surface, of a sack by means of friction welding.

In order to reduce the melting point of the coating and to obtain a nonskid coating surface, the process according to the invention may be developed in such a way that a copolymer of ethylene and vinyl acetate is mixed into the coating of the tape fabric and/or of the intermediate layer of thermoplastic material.

Particularly in the case of box sacks or box valve sacks it may be convenient to provide, prior to the step of introducing a polymer melt between the end surface and the cover sheet, at least one opening in at least one longitudinal fabric flap in that area which, in its folded state, overlaps a fabric flap of the narrow side. In this way the upper side of the narrow-side flap is welded directly with the cover sheet, thereby preventing a funnel from being formed from fabric flaps through which filled material may escape.

An embodiment of the present process which ensures the sealing of the folding edge area is characterized in that there is provided, particularly prior to folding the flaps to an end surface of the sack and at least on one side of an area close to, and in particular within, the common portion of the folding edge between a longitudinal and a narrow-side fabric flap, at least one adhesive point or adhesive area of a cold-bonding agent, hot-melt-type adhesive or a thermoplastic material, particularly polyolefine, having a lower melting point than the material of the fabric or of the intermediate layer, and in that after folding the flaps in a further step by applying heat and/or pressure the adhesive material is bonded to the longitudinal as well as the narrow-side flaps.

The upper side of the narrow-side fabric flap may also be welded with the lower side of the overlying longitudinal flap by blowing in hot air between the overlapping areas of the longitudinal and narrow-side fabric flaps of an end surface of the sack and by subsequently pressing the flaps against each other so as to bond them. This embodiment of the process also ensures that the pockets formed by the folds do not swell, thereby preventing the creation of a funnel.

One embodiment of the process according to the invention is characterized in that the longitudinal and the narrow-side fabric flaps as well as those formed by folding pockets are welded onto each other by pressing a heated pin or a heated plate against the outside of the end surface of the sack.

A variant of the present process which is very useful for valve sacks is characterized in that, prior to the step of introducing molten polymer between the end surface and the cover sheet, at least one opening is formed in at least one longitudinal fabric flap involved in the formation of an end surface of the sack in an area which is defined by the inner edge of the narrow-side flap and the inner edge of a valve disposed between the narrow-side and longitudinal flaps. This makes it possible to weld the upper side of the valve and the lower side of the cover sheet, which prevents the valve from turning inside out when the filler muff is pulled out.

BRIEF DESCRIPTION OF THE DRAWINGS

The invention will now be described by means of examples and by referring to accompanying drawings.

FIG. 13 presents the valve side of an embodiment of the sack of FIG. 1 in a partly folded state, while

DESCRIPTION OF THE PREFERRED EMBODIMENTS

Figure 1:
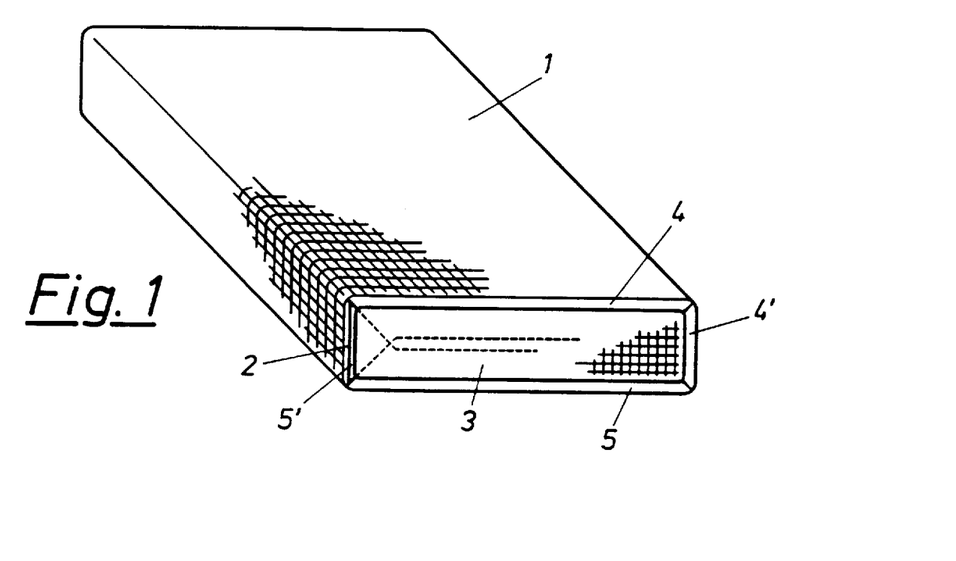
FIG. 1 is a perspective view of a sack according to the invention made of tubular fabric.

FIG. 1 shows a box-shaped sack according to the invention which consists of circular fabric 1 made of monoaxially drawn polyolefine tapes, such as polypropylene or polyethylene, which have a thickness of 20–80 $\mu$m and a strength of several g/denier, typically 4–6.5 g/denier. The bottom surfaces of this box sack are formed by folding fabric flaps 4,4',5,5'. As indicated in the dashed lines flaps 4 and 5 overlap each other only slightly. Between the flaps 5' and 4 or 5 there is provided a valve 2 which consists of sheet-like or tubular materials such as fabrics and foils and through which the sack is filled. When the sack is filled the valve tube is closed by the pressure of the filled material against the end surface. Onto the flaps 4, 5 there is welded a cover sheet 3. The welding processes suitable for this purpose will be described later. The cover sheet 3 preferably consists of the same material as the fabric 1, with the fabric 1 and/or cover sheet 3 being optionally coated on one or both sides. The sack of the invention is particularly characterized by the fact that because the cover sheet is welded on, the molecule chains in the tapes are not oriented anymore to a minor extent only, typically down to a heat penetration depth of 2–40 μm, in particular 3–10 μm, so that the fabric hardly loses its strength.

Figure 2:
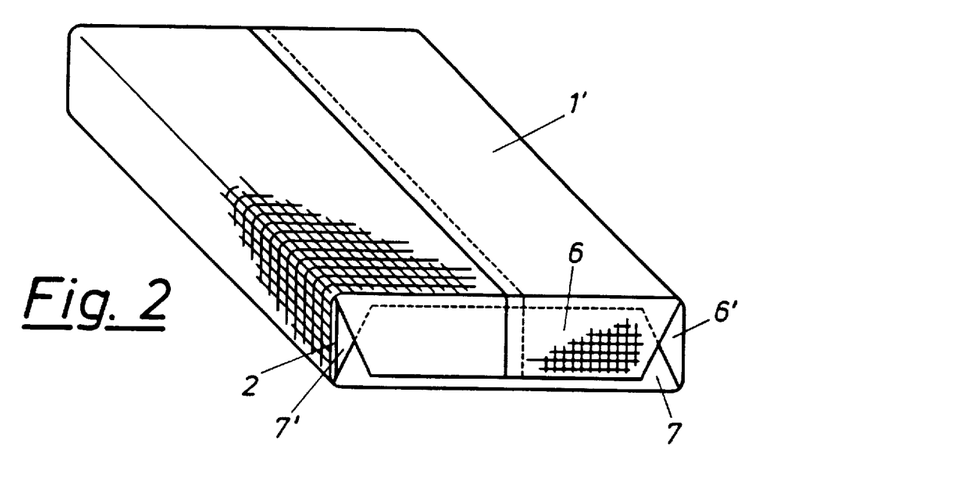
FIG. 2 shows a sack according to the invention made of flat fabric and having a longitudinal seam.

FIG. 2 shows another embodiment of the sack of the invention. It differs from the embodiment presented in FIG. 1 primarily because a flat fabric 1' having a longitudinal seam has been formed into a tube, and the flaps 6 and 7, since they overlap each other almost entirely, serve as bottom surface and cover sheet, thereby making a separate cover sheet superfluous. The two flaps 6 and 7 are welded together according to a process of the invention.

The side flaps 6' and 7' are folded in accordance with the flaps 4' and 5' of FIG. 1. Between the flaps 7' and 6 or 7 there is again provided a tubular valve 2.

Figure 3:
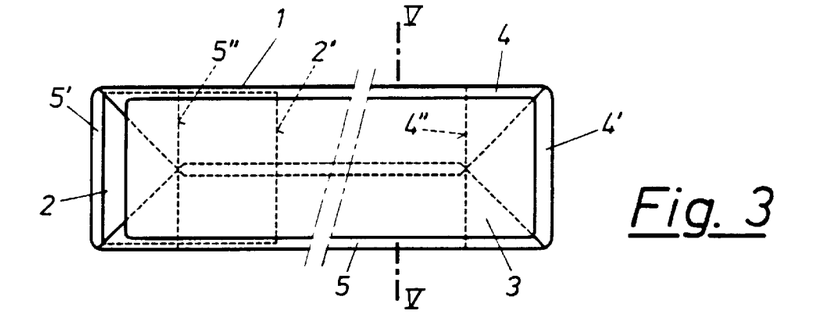
FIG. 3 is a plan view of the valve side having a cover sheet of the embodiment according to FIG. 1.

FIG. 3 is a plan view of the valve side of the sack according to FIG. 1. As can be seen the side flaps 4',5' were first folded inwardly, extending to the dashed line 4",5", above therefrom a tube piece 2 as a valve is disposed on one side, extending to line 2', above therefrom the two flaps 4 and 5 were folded, and the cover sheet 3 is welded on.

Figure 4:
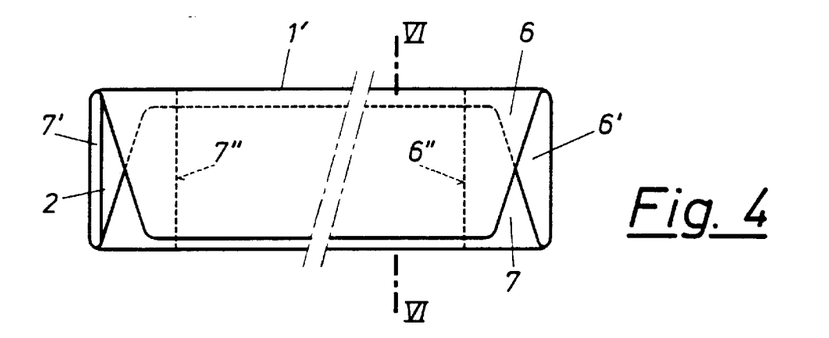
FIG. 4 is a plan view of the valve side without the cover sheet of the embodiment according to FIG. 2.

FIG. 4 is a plan view of the valve side of the sack according to FIG. 2. The side flaps 6',7' with their edges 6",7" are first folded inwardly, and above therefrom the flaps 6 and 7 are folded and welded together, the flap 7 serving as bottom surface and the flap 6 as cover sheet. A valve 2 is provided between the flaps 7' and 6 or 7.

Figure 5:
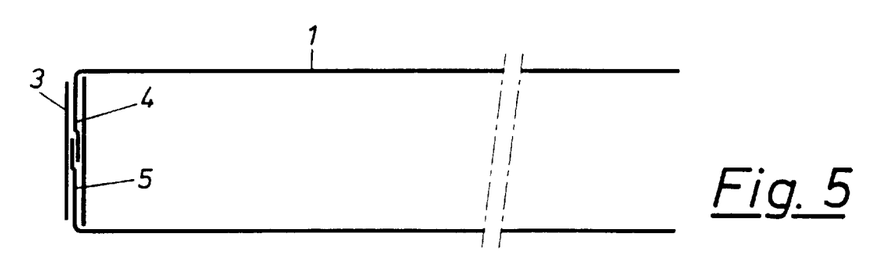
FIG. 5 is a cross-section of a sack having a cover sheet.

FIG. 5 is a longitudinal cross-section along line V—V taken from FIG. 3. This figure shows how flaps 4 and 5 and the cover sheet 3 are superimposed.

Figure 6:
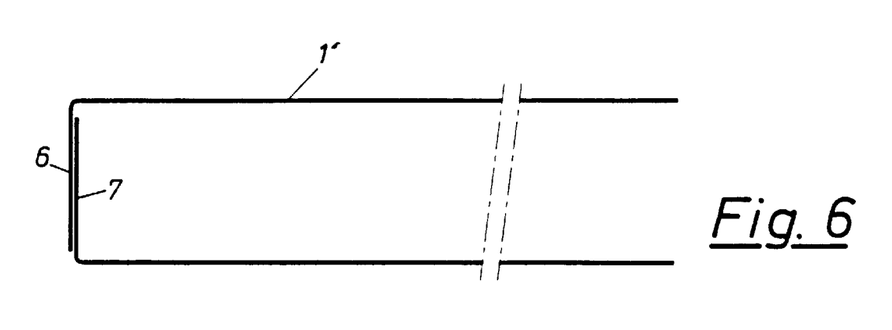
FIG. 6 is a cross-section of a sack without a cover sheet.

FIG. 6 is a longitudinal cross-section along line VI—VI taken from FIG. 4. This, figure clearly shows how flaps 6 and 7 are superimposed.

Figure 7:
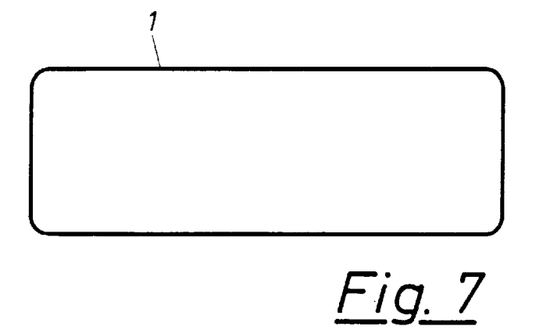
FIG. 7 is a cross-section of a sack made of tubular fabric.
Figure 8:
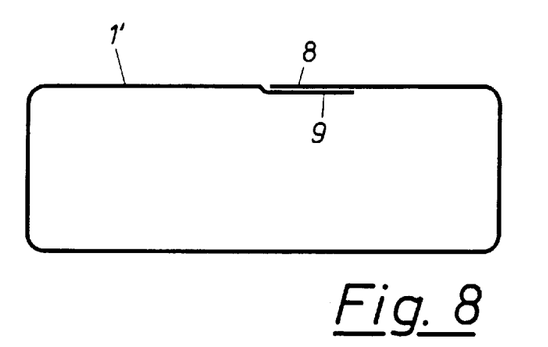
FIG. 8 is a cross-section of a sack made of flat fabric having a longitudinal extrusion seam.
Figure 8A:
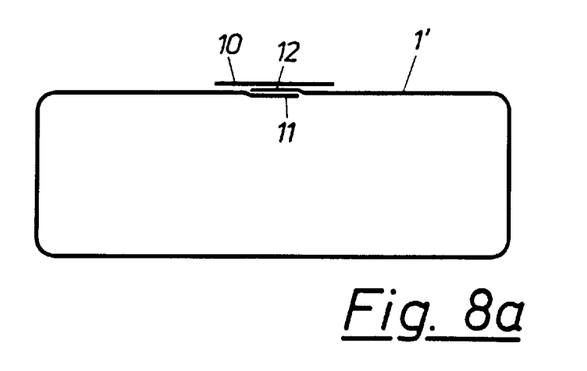
FIG. 8a is a cross-section of a sack having a longitudinal seam with a welded or adhered cover ribbon.

FIGS. 7, 8 and 8a show various cross-sectional shapes of the sacks according to the invention. FIG. 7 presents a sack made of circular tape fabric 1; FIG. 8 presents a sack made of flat fabric 1' whose superimposed ends 8, 9 have been connected by a longitudinal seam and which has thus been formed into a tube, wherein the longitudinal seam may also be an extrusion seam; and FIG. 8a shows a sack made of flat fabric having a longitudinal seam and a cover ribbon 10 welded or adhered thereto above the superimposed ends 11, 12.

Referring to FIGS. 9–12 various embodiments of the process of welding on the cover sheet will now be described.

Figures 9, 10, 11:
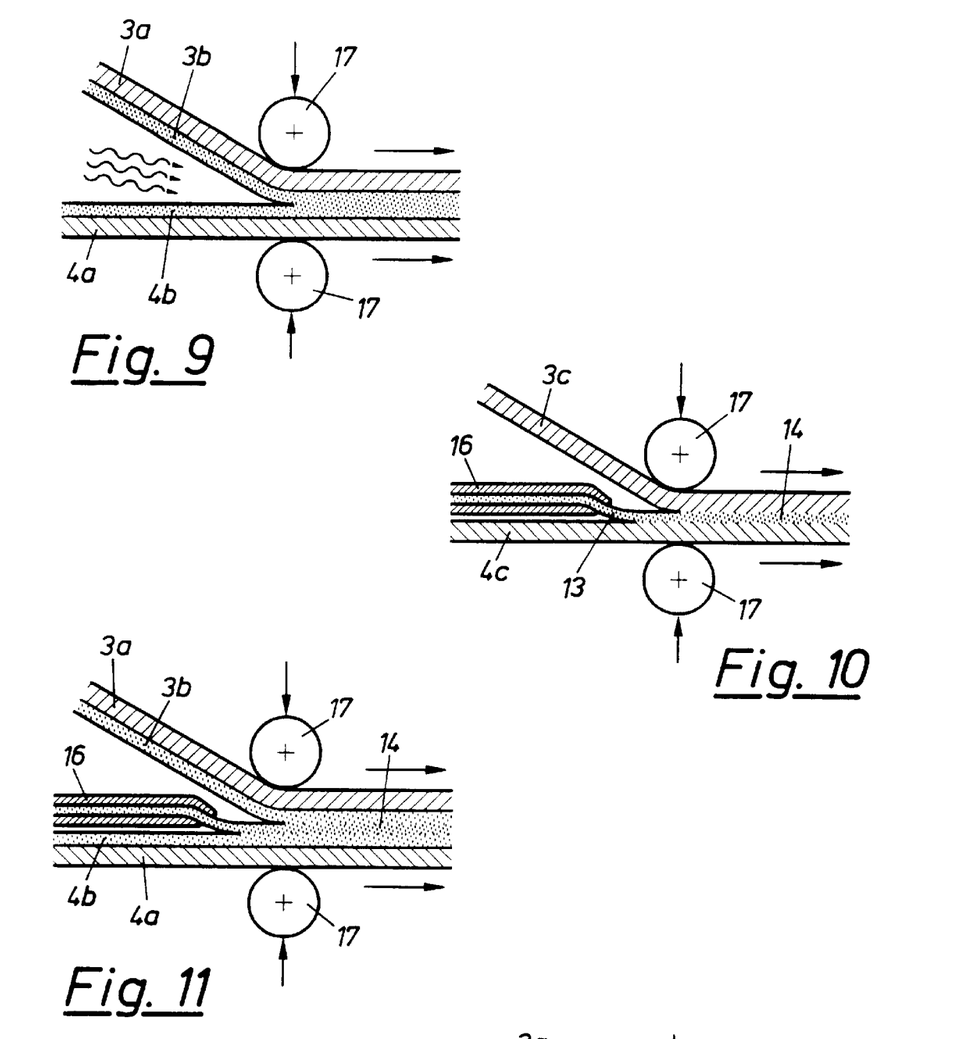
FIGS. 9–12 show various modes for carrying out the process of the invention.

FIG. 9 shows an embodiment wherein a cover sheet consisting of tape fabric 3a and a coating 3b made of polyolefines, such as polypropylene, is to be bonded to a sack flap consisting of tape fabric 4a and a coating 4b of the same polyolefine material. The thickness of the tape fabrics 3a, 4a are between 40 and 160 μm, those of the coatings 3b, 4b 5–60 μm. For this purpose the coating sides 3b, 4b facing each other are heated down to a penetration depth of 2–40 μm, particularly 3–10 μm, until they plasticize and are passed between two cooled rollers 17, 17 as indicated by the arrows, the layers 3b, 4b being pressed with each other so that an intimate bond is created and cooling is effected at the same time by the pair of rollers 17, 17, the cooling being necessary to avoid any heat-induced damage to the tape fabric 3a, 4a. Since mainly the coating is heated, the tapes' molecule chains lose their orientation to a small depth only, making sure that there is no substantial loss of strength.

FIG. 10 shows yet another embodiment of the process, wherein two non-coated fabrics 3c, 4c are welded with each other. For this purpose a layer of melt 14 coming from a broad-slit extrusion jet 16 is introduced between the tape fabric 3c, 4c. Fabrics 3c, 4c and the melt 14 usually consist of the same polyolefine material. The extrusion temperature of the melt is 150°–380° C., preferably 230°–260° C. The fabrics are passed between a pair of rollers 17, 17 as indicated by the arrows, thereby being pressed with the melt 14 and simultaneously cooled, so that the tapes' strength is rot substantially impaired.

This embodiment of the process is not limited to uncoated tape fabrics but can be applied to any coated fabric, as can be seen in FIG. 11, wherein a cover sheet, which consists of tape fabric 3a and a coating 3b, and a flap, which is formed by tape fabric 4a and a coating 4b, are welded with each other by introducing a melt 14 between the coated sides. By being pressed against each other the coatings 3b, 4b and the melt 14 form a homogeneous intermediate layer.

Figure 12:
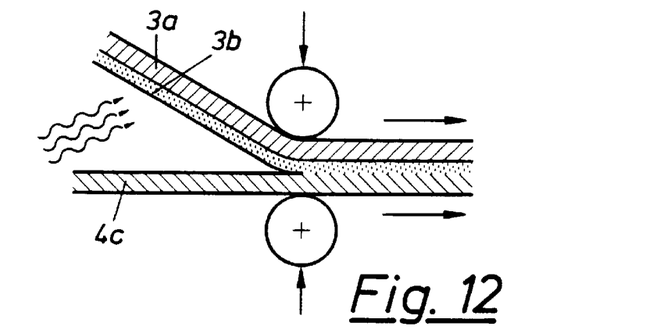

Welding can also be effected by heating the fabric coating if only one fabric is coated, as indicated in FIG. 12. Uncoated fabric 4c is intimately bonded, by means of heat welding, to fabric 3a having a coating 3b.

The thermoplastic material, in particular polyolefine material, which forms the coating and/or the intermediate layer, may be mixed with an ethylene and vinyl acetate copolymer, which is generally known as EVA. This EVA has a lower melting point than polyethylene. By adding EVA the coating is made considerably more weldable. In addition, the coating forms a non-sliding covering by being mixed with EVA, which increases the stackability of the present sacks.

Figure 13:
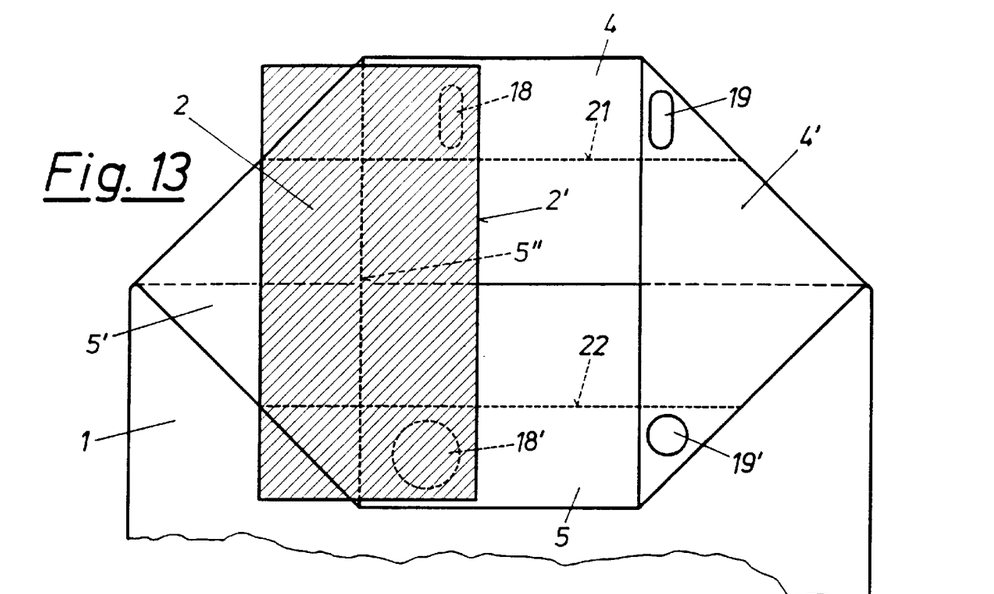
Figures 14, 15:
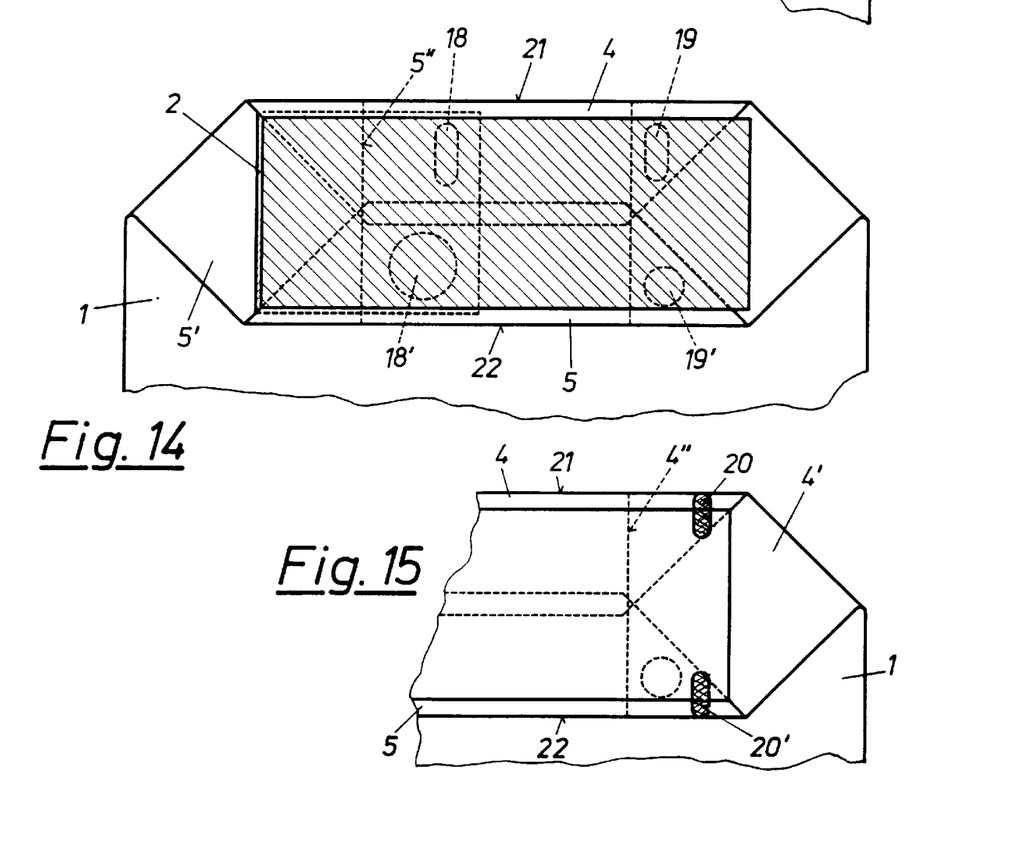
FIGS. 14 and 15 are additional embodiments of end surfaces of the present sack.

In FIGS. 13–15 problems occurring with box- or block-sacks and particularly box valve sacks or block bottom, bags are addressed in greater detail. FIG. 13 shows an embodiment of the sack of FIG. 1 in a partly folded state. At the end of the circular fabric 1 the narrow-side fabric flaps 4',5' are already folded inwardly, and valve foil 2 is attached to the flap 5'. Conveniently, the foil 2 is attached to the flap 5' by heat welding on a rectangular surface defined by the folding edges 21, 22, the outer edge of the foil 2 and the inner edge 5" of the flap 5'. Later on in the process the longitudinal flaps 4, 5 are bent inwardly along the folding edges 21, 22, thereby also bending the sides of the foil 2 inwardly and forming the tubular valve 2. Subsequently, according to the process of the invention, a cover sheet 3 is welded onto the end surface of the sack. This manufacturing step is presented in FIG. 14, which will also be described in the following. Through the tubular valve 2 a muff may be inserted in order to charge the sack with filling material. In filling installations the problem arises that because there is an excess pressure within the sack created during the filling process or because the valve is attached to the muff by heat or friction when the muff is pulled out, the part of the valve hanging loosely within the sack is turned inside out until it reaches its connection location at flap 5'. As a result the valve loses some of its sealing effect because the effective length of the valve has considerably shortened by turning the tube inside out. According to the invention the problem is solved by punching out openings 18, 18' in the area between the edge line 5" of the flap 5' and the inner edge 2' of the valve 2, so that after the flaps 4, 5 have been folded inwardly the cover sheet 3 can be welded with the upper side of the valve 2 through these openings 18, 18'. This effectively prevents the valve 2 from being pulled out together with the filling muff. The openings may have any desirable shape. For example, the opening 18 is longitudinal and the opening 18' circular in shape.

With box sacks in general and valve box sacks in particular there is another undesirable effect: by folding the fabric flaps 4, 4', 5, 5' to an end surface within the sack, four triangular pockets are formed which act like funnels whose outlet openings are disposed in the folding edges 21, 22. For reasons inherent in the manufacturing process it is not possible to weld the cover sheet 3 precisely to the folding edges 21, 22, so that generally at the ends of the folding edges small apertures remain open which lead into the above pockets. This has no negative effect on the bottom of the sack, since the pockets are compressed and hence sealed by the weight of the filling material. However, when filling the box valve sacks, wherein the filling material is introduced by means of compressed air through an inserted muff, the compressed air makes these pockets swell and form funnels at the side opposite the valve as it enters, and the material (mostly in powdery form) is pressed out of the sack through the "funnel outlet". In order to avoid this further openings 19, 19' in the longitudinal flaps 4, 5 are provided in an area of the flaps 4, 5 which after folding overlaps the narrow-side fabric flap 4'. When the cover sheet 3 is welded on, the flap 4' is bonded to the cover sheet 3 through these openings 19, 19'. The swelling and formation of a funnel is thus avoided.

Another method, wherein powdery filled material is prevented from leaking out of the corners of the end surface of the sack, is shown in FIG. 15. Again, the end surface is formed by folding the flaps 4, 4', 5 of the tubular fabric 1. The narrow-side flap 4' reaches to the edge 4" towards the center of the sack. Pockets formed by overlapping are also seen. In this embodiment of the invention the openings in the folding edges 21, 22 are closed by applying, prior to folding the flaps 4, 4', 5 into an end surface of the sack, in the common part of the folding edge 21, 22 between a longitudinal 4, 5 and a narrow-side 4' fabric flap, an adhesive point or an adhesive area 20, 20' made of a cold-bonding agent, a hot-melt-type adhesive or a thermoplastic material, particularly polyolefine, having a lower melting point than the material of the fabric or of the intermediate layer, and by bonding in a further step the adhesive material 20, 20' to the longitudinal 4, 5 as well as the narrow-side 4' flap after folding the flaps by applying heat and/or pressure. It is also possible to bond the four layers of fabric, i.e. the longitudinal and the narrow-side flaps and the two flaps forming the pockets, by pressing a heated pin or a heated plate onto the outer side of an end surface of the sack and by pressing against this pin or plate a heat-resistant or Teflon-coated plate from the inner side of the sack by a welding point or a welding area. In this area of welding the molecule chains lose their orientation, but since the welding area is very small relative to the overall end surface and four layers are bonded to each other in the welding area, there is no decrease in the overall strength of the end surface. In this way the end surfaces of the sack can be closed completely and with little effort.

What is claimed is:

1. A sack made of fabric comprising monoaxially drawn tapes of polymer, wherein the fabric is a tubular fabric and at least one end of the sack is formed by folding fabric ends of the fabric to form a bottom surface, wherein at least one end of the sack is bonded, via an intermediate layer, by means of heat to a cover sheet made of fabric comprising monoaxially drawn tapes of polymer, and wherein less than 30% of the material thickness of the fabric tapes of the bottom surface and the cover sheet includes disoriented polymer molecules due to the heat, wherein a remainder of the material of the fabric tapes has molecules that are oriented.

2. A sack according to claim 1, wherein the sack has the shape of a box and the bottom surface is rectangular.

3. A sack according to claim 1, wherein the fabric comprises monoaxially drawn single-layer tapes of polymer material selected from the group consisting of polyolefine and polypropylene.

4. A sack according to claim 1, wherein fabric is coated on at least one side with thermoplastic material.

5. A sack according to claim 4, wherein the coated fabric comprises a coating which serves as an intermediate layer between an end of the sack and the cover sheet.

6. A sack according to claim 4, wherein the coated fabric comprises a coating which is mixed with an ethylene and vinyl acetate polymer and the intermediate layer is made of thermoplastic material.

7. A sack according to claim 4, wherein the coated fabric comprises a coating having a thickness of about 5–60 $\mu$m.

8. A sack according to claim 1, wherein the bottom surface is bonded via the intermediate layer to the cover sheet.

9. A sack according to claim 1, wherein the sack comprises fabric parts which are folded to form an end of the sack and which do not substantially overlap each other, and a separate cover sheet for sealing off the bottom surface.

10. A sack according to claim 9, wherein the fabric parts comprise a longitudinal fabric part and a narrow-side fabric part forming a folding edge, wherein at least one adhesive area is formed at at least one side of an end surface formed by the fabric parts in an area near a common part of the folding edge between the longitudinal fabric part and the narrow-side fabric part, the adhesive area being made of a material selected from the group consisting of a cold-bonding agent, a hot-melt adhesive, and a thermoplastic material being lower in melting point than the material of the fabric.

11. A sack according to claim 10, wherein the adhesive area comprises an adhesive point.

12. A sack according to claim 9, wherein the fabric parts comprise a plurality of longitudinal fabric parts and narrow-side fabric parts, wherein on at least one side of an end surface formed by the fabric parts at least one of the longitudinal fabric parts has at least one opening in an area which, in a folded state, overlaps one narrow-side fabric part.

13. A sack according to claim 9, wherein the fabric parts comprise a plurality of longitudinal fabric parts and narrow-side fabric parts, wherein the longitudinal fabric parts and narrow-side fabric parts forming one end surface of the sack are at least partly welded together in areas where the longitudinal fabric parts and narrow-side fabric parts overlap each other.

14. A sack according to claim 9, wherein the fabric parts are folded to form ends of the sack and pockets are formed by folding superimposed layers of the fabric parts in areas of end surfaces at the ends of the sack, and wherein the areas of the end surfaces are bonded to each other by a welding area.

15. A sack according to claim 1, further comprising a layer of molten plastic material interposed between an end of the sack and the cover sheet.

16. A sack according to claim 1, further comprising at least one valve disposed between an end of the sack and the cover sheet for filling with a filling material.

17. A sack according to claim 16, wherein the at least one valve is disposed between the bottom surface and the cover sheet.

18. A sack according to claim 16, wherein the at least one valve is automatically closed by pressure of the filling material when the sack is full.

19. A sack according to claim 16, wherein the sack comprises longitudinal and narrow-side fabric parts which form the end surface of the sack, wherein there is provided at least one opening in at least one longitudinal fabric part involved in the formation of the end surface of the sack in an area between an inner edge of one narrow-side fabric part involved in the formation of the end surface of the sack and an inner edge of the at least one valve, the area being disposed between the narrow-side fabric part and longitudinal fabric parts.

20. A sack according to claim 1, wherein the tape fabric is perforated.

21. A sack according to claim 1, wherein the monoaxially drawn tapes of polymer have a thickness of about 20–80 μm.

22. A process for welding a cover sheet onto an end surface of a sack having a sack material, wherein the cover sheet and the sack material comprise foils or fabrics made of monoaxially drawn tapes of polymer, the process comprising the steps of:

introducing an intermediate layer made of molten polymer between the end surface and the cover sheet;

pressing the end surface and the cover sheet together; and cooling the end surface, intermediate layer, and cover sheet to ambient temperature, wherein only an external surface area of the end surface and the cover sheet includes disoriented polymer molecules and a remainder of the material includes molecules that are oriented.

23. A process according to claim 22, wherein the step of introducing comprises introducing the intermediate layer at a temperature of about 150°–380° C.

24. A process according to claim 23, wherein the step of introducing comprises introducing the intermediate layer at a temperature of about 230°–260° C.

25. A process according to claim 22, wherein the step of introducing comprises introducing the intermediate layer between a bottom surface of the sack and the cover sheet.

26. A process according to claim 22, wherein the steps of pressing and cooling are performed substantially simultaneously by pressing the end surface and the cover sheet together using at least one cooled pressing element.

27. A process according to claim 26, wherein the steps of pressing and cooling comprise pressing the end surface and the cover sheet together using a pair of cooled rollers.

28. A process according to claim 22, wherein the step of introducing comprises introducing the intermediate layer made of molten polymer through a broad-slit or fiber-extrusion die between the end surface and the cover sheet.

29. A process according to claim 22, further comprising the step of heating the end surface and the cover sheet.

30. A process according to claim 29, wherein the steps of heating and pressing are performed substantially simultaneously by pressing the end surface and the cover sheet together using at least one heated roller having a line surface profile.

31. A process according to claim 22, further comprising the step of folding longitudinal and narrow-side fabric flaps of the sack to form the end surface.

32. A process according to claim 31, further comprising, prior to the step of introducing, the step of providing at least one opening in at least one longitudinal fabric flap involved in the formation of the end surface of the sack in an area which overlaps one narrow-side fabric flap involved in the formation of the end surface, wherein the step of introducing comprises introducing the intermediate layer through the at least one opening.

33. A process according to claim 31, further comprising, prior to the step of folding, the step of providing at least one adhesive area at least on one side of an area close to a common portion of a folding edge formed between one longitudinal fabric flap and one narrow-side fabric flap, the at least one adhesive area being made of a material selected from the group consisting of a cold-bonding agent, a hot-melt adhesive, and a thermoplastic material being lower in melting point than the material of the fabric.

34. A process according to claim 33, further comprising, subsequent to the step of folding, the step of applying heat to bond the longitudinal and narrow-side flaps with the at least one adhesive area.

35. A process according to claim 33, further comprising, subsequent to the step of folding, the step of applying pressure to bond the longitudinal and narrow-side flaps with the at least one adhesive area.

36. A process according to claim 33, further comprising, subsequent to the step of folding, the step of applying hot air and pressure to bond the longitudinal and narrow-side flaps with the at least one adhesive area.

37. A process according to claim 31, wherein the step of folding comprises forming a pocket.

38. A process according to claim 37, further comprising the step of welding the longitudinal and narrow-side fabric flaps and the pocket with each other by pressing a heated pin from outside the end surface of the sack against the fabric flaps and pocket.

39. A process according to claim 31, further comprising, prior to the step of introducing, the step of providing at least one opening in at least one longitudinal fabric flap involved in the formation of the end surface of the sack in an area which is defined by an inner educe of the narrow-side fabric flap involved in the formation of the end surface and an inner edge of a valve disposed between the narrow-side and longitudinal fabric flaps, wherein the step of introducing comprises introducing the intermediate layer through the at least one opening.

40. A process for welding a cover sheet onto an end surface of a sack using a fabric for the sack or the cover sheet, the process comprising the steps of:

coating at least one surface of the fabric with a molten polymer;

heating the fabric coating until only an outside surface area of the coating becomes plasticized;

pressing the end surface and the cover sheet together; and cooling the end surface and cover sheet to ambient temperature, wherein only an external surface area of the end surface and the cover sheet includes disoriented polymer molecules and a remainder of the end surface and cover sheet has oriented molecules.

41. A process according to claim 40, wherein the step of heating comprises heating the fabric coating by means of hot air.

42. A process according to claim 40, further comprising the step of mixing the coating with an ethylene and vinyl acetate polymer.

* * * * *

(12) EX PARTE REEXAMINATION CERTIFICATE (8345th)
United States Patent
Huemer (10) Number: US 5,845,995 C1
(45) Certificate Issued: Jun. 28, 2011

(54) BAG MADE OF POLYMER AND ESPECIALLY POLYOLEFINE FABRIC AND PROCESS FOR PRODUCING IT

(75) Inventor: Franz Starlinger Huemer, Vienna (AT)

(73) Assignee: Starlinger & Co. Gesellschaft mbH, Vienna (AT)

Reexamination Request:
No. 90/010,933, Mar. 23, 2010

Reexamination Certificate for:
Patent No.: 5,845,995
Issued: Dec. 8, 1998
Appl. No.: 08/732,308
Filed: Oct. 16, 1996

(22) PCT Filed: Apr. 26, 1995

(86) PCT No.: PCT/AT95/00080
§ 371 (c)(1),
(2), (4) Date: Oct. 16, 1996

(87) PCT Pub. No.: WO95/30598
PCT Pub. Date: Nov. 16, 1995

(51) Int. Cl.
*B65D 30/18* (2006.01)

(52) U.S. Cl. .................. 383/125; 383/121; 383/908; 383/117; 493/218; 493/219

(58) Field of Classification Search .............. 383/125
See application file for complete search history.

(56) References Cited

U.S. PATENT DOCUMENTS

| 3,237,534 A | 3/1966 | Lissner |
| 3,951,050 A | 4/1976 | Poole |
| 3,953,272 A | 4/1976 | Webber |
| 5,104,235 A | 12/1990 | Brönstrup et al. |
| 5,061,170 A | 10/1991 | Allen |

FOREIGN PATENT DOCUMENTS

DE 3236770 A1 6/1983

*Primary Examiner*—William C. Doerrler (57) ABSTRACT

This invention relates to a sack made of fabric consisting of monoaxially drawn, desirably single-layer, tapes of polymer, particularly polyolefine, preferably polypropylene, which fabric may be coated on one or both sides with a thermoplastic material, particularly polyolefine, wherein the fabric is a seamless tubular fabric or a flat fabric combined to form a tube and at least one end of the sack having in particular the shape of a box or a right parallelepiped is formed by folding the fabric ends to a particularly rectangular bottom surface. The present sack is characterized in that at least one end of the sack, particularly a bottom surface, is bonded, via an intermediate layer particularly made of thermoplastic, particularly polyoefine, preferably polypropylene material, and by means of heat, to a cover sheet made of fabric consisting of monoaxially drawn tapes of polymer, in particular polyolefine and preferably polypropylene, and in that only the external surface area, in particular less than 30% of the material thickness of the fabric tapes, includes disoriented polymer, in particular polyolefine and preferably polypropylene, molecules due to the heat, wherein in the rest of the material area the molecules are oriented. The invention also relates to a process for welding a cover sheet onto a bottom surface of the sack.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5, 8-10, 13, 14, 16, 17, 22 and 26-31 is confirmed.

Claim 40 is determined to be patentable as amended.

Claim 41, dependent on an amended claim, is determined to be patentable.

Claims 6, 7, 11, 12, 15, 18-21, 23-25, 32-39 and 42 were not reexamined.

40. A process for welding a cover sheet onto an end surface of a sack using a fabric for the sack or the cover sheet, the process comprising the steps of:

coating at least one surface of the fabric with a molten polymer;

heating the fabric coating until only an outside surface area of the coating becomes plasticized;

pressing the end surface and the cover sheet together; and cooling the end surface and cover sheet to ambient temperature, wherein only an external surface area of the end surface and the cover sheet includes disoriented polymer molecules and a remainder of the end surface and cover sheet has oriented molecules;

*wherein less than 30% of the material thickness of the end surface and the cover sheet includes disoriented polymer molecules due to the heating, wherein a remainder of the material of the fabric has molecules that are oriented.*

* * * * *